United States Patent
Flock et al.

(10) Patent No.: US 11,425,348 B2
(45) Date of Patent: Aug. 23, 2022

(54) OPTICAL DISPLAY DEVICE AND METHOD OF OPERATING AN OPTICAL DISPLAY DEVICE

(71) Applicant: OSRAM Opto Semiconductors GmbH, Regensburg (DE)

(72) Inventors: Klaus Flock, Regensburg (DE); Hubert Halbritter, Dietfurt (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 0 days.

(21) Appl. No.: 17/286,163

(22) PCT Filed: Oct. 14, 2019

(86) PCT No.: PCT/EP2019/077780
§ 371 (c)(1),
(2) Date: Apr. 16, 2021

(87) PCT Pub. No.: WO2020/078903
PCT Pub. Date: Apr. 23, 2020

(65) Prior Publication Data
US 2021/0352249 A1 Nov. 11, 2021

(30) Foreign Application Priority Data
Oct. 19, 2018 (DE) .......................... 102018126065.2

(51) Int. Cl.
*H04N 9/31* (2006.01)
*G02B 26/08* (2006.01)
*G02B 27/01* (2006.01)

(52) U.S. Cl.
CPC ......... *H04N 9/317* (2013.01); *G02B 26/0808* (2013.01); *G02B 27/0179* (2013.01); *G02B 2027/0185* (2013.01)

(58) Field of Classification Search
CPC .. G03B 21/28; G03B 21/142; G03B 21/2013; G03B 21/2033; G03B 21/2053;
(Continued)

(56) References Cited

U.S. PATENT DOCUMENTS 10,732,410 B2 * 8/2020 Ishihara ............ G02B 27/0101
2002/0159156 A1 10/2002 Wohlstadter
(Continued)

FOREIGN PATENT DOCUMENTS

CN 102455516 A 5/2012
CN 107783207 A 3/2018
(Continued)

OTHER PUBLICATIONS

International Search Report issued for corresponding International Patent Application No. PCT/EP2019/077780 dated Feb. 5, 2020, along with an English translation.
(Continued)

*Primary Examiner* — Sultan Chowdhury
(74) *Attorney, Agent, or Firm* — Hauptman Ham, LLP (57) ABSTRACT

An optical display device includes a plurality of emitters configured to emit electromagnetic radiation in a main emission direction and at least one optical modulation unit which has an adjustable focal length. The emitters are arranged in a main plane and are separately controllable from one another. The optical modulation unit is arranged downstream of the emitters in the main emission direction. Images of the emitters are generated by means of the optical modulation unit, the images of the emitters each having a distance from the main plane which can be predetermined by means of the adjustable focal length. Methods of operating an optical display device are also disclosed.

20 Claims, 2 Drawing Sheets

(58) Field of Classification Search
CPC .... G03B 21/2066; G02B 26/02; G02B 26/04; G02B 26/08; G02B 26/0808; G02B 26/0875; G02B 27/0101; G02B 27/0179; G02B 2027/0179; G02B 2027/0185; H04N 9/315; H04N 9/317; H04N 9/3152; H04N 9/3158; H04N 9/3161; H04N 9/3164

See application file for complete search history.

(56) References Cited

U.S. PATENT DOCUMENTS

| | | |
|---|---|---|
| 2004/0164927 A1 | 8/2004 | Suyama et al. |
| 2005/0179868 A1 | 8/2005 | Seo et al. |
| 2007/0070476 A1 | 3/2007 | Yamada et al. |
| 2007/0229495 A1 | 10/2007 | Ito |
| 2009/0015797 A1* | 1/2009 | Hatanaka ........... G03B 21/2013 353/31 |
| 2009/0185251 A1* | 7/2009 | Chen .................... H04N 9/3161 359/199.3 |
| 2012/0313980 A1* | 12/2012 | Kjaer ...................... F21V 29/77 353/57 |
| 2013/0286362 A1* | 10/2013 | Imai ....................... G03B 21/53 353/85 |
| 2016/0295202 A1* | 10/2016 | Evans .................. H04N 13/322 |
| 2017/0061867 A1 | 3/2017 | Cok et al. |
| 2017/0160518 A1 | 6/2017 | Lanman et al. |
| 2017/0269353 A1 | 9/2017 | Xu |
| 2018/0284286 A1* | 10/2018 | Eichenholz ............. G01S 17/89 |
| 2019/0049632 A1* | 2/2019 | Shin .................. G02B 27/4277 |
| 2019/0137665 A1* | 5/2019 | You ...................... G02B 27/425 |

FOREIGN PATENT DOCUMENTS

| | | |
|---|---|---|
| CN | 107783304 A | 3/2018 |
| WO | 2011/029409 A1 | 3/2011 |
| WO | 2017/176921 A1 | 10/2017 |

OTHER PUBLICATIONS

Written Opinion issued for corresponding International Patent Application No. PCT/EP2019/077780 dated Feb. 5, 2020.

* cited by examiner

OPTICAL DISPLAY DEVICE AND METHOD OF OPERATING AN OPTICAL DISPLAY DEVICE

CROSS REFERENCE TO RELATED APPLICATION

This application is a National Stage of International Application No. PCT/EP2019/077780, filed on Oct. 14, 2019, which designates the United States and was published in Europe, and which claims priority to German Patent Application No. 102018126065.2, filed on Oct. 19, 2018, in the German Patent Office. Both of the aforementioned applications are hereby incorporated by reference in their entireties.

An optical display device and a method of operating an optical display device are disclosed. The optical display device can be configured to display image contents that are perceptible to the human eye. In particular, the optical display device is configured for displaying three-dimensional image contents.

A object to be achieved is to specify an optical display device that enables the display of image content that is perceptible to the human eye.

A further object to be achieved is to specify a method of operating an optical display device that enables the display of image content that is perceptible to the human eye.

According to at least one embodiment, the optical display device comprises a plurality of emitters configured to emit electromagnetic radiation in a main emission direction. The emitters are preferably arranged for emission of incoherent electromagnetic radiation. In particular, the emitters exhibit a directional emission behavior. The smaller the expansion of the emitting surface of the emitter, the more the emitter approaches a point light source that radiates uniformly in all spatial directions. Radiation over a certain angular range is advantageous so that the image of a point appears to be point-like. A laser beam can, depending on beam diameter and/or divergence, be widened if necessary to provide a small image. The main emission direction is the direction in which a majority of the electromagnetic radiation emitted by the emitters is emitted. Each emitter may be formed with a plurality of emission regions, each arranged to emit electromagnetic radiation at a different wavelength. A different wavelength means here and hereinafter a different wavelength perceptible to the human eye. Further, an emitter may be a pixelated emitter having a plurality of sub-emitters each adapted to emit electromagnetic radiation having a different wavelength.

According to at least one embodiment, the optical display device comprises at least one optical modulation unit having an adjustable focal length. The optical modulation unit is formed, for example, with at least one optical element that has a diffractive or a refractive effect. In particular, the optical modulation unit is an imaging optics. The optical modulation unit can produce an image in a corresponding image width from an object arranged at a certain object distance from the optical modulation unit, for example an emitter. The image width is determined by the focal length of the optical modulation unit and the object width. The focal length of the optical modulation unit is variably adjustable to a predetermined value.

According to at least one embodiment of the optical display device, the emitters are arranged in a main plane. The emitters are arranged in a common plane laterally spaced apart or directly adjacent to each other. The main plane extends transversely, in particular perpendicularly, to the main emission direction of the emitters. In other words, the main emission directions of the emitters run parallel to each other.

According to at least one embodiment of the optical display device, the emitters can each be controlled separately from one another. The emitters can be switched on or off independently of each other. The emitters are thus particularly suitable for displaying visual patterns and/or images.

According to at least one embodiment of the optical display device, the optical modulation unit is arranged downstream of the emitters in the main emission direction. The optical modulation unit is arranged downstream of the emitters in such a way that the electromagnetic radiation emitted by the emitters during operation can be coupled into the optical modulation unit as unhindered as possible.

According to at least one embodiment of the optical display device, images of the emitters are generated by means of the optical modulation unit, wherein the images of the emitters each have a distance from the main plane that can be predetermined by means of the adjustable focal length of the optical modulation units. For an observer of the optical display device, the perceived distance of an emitter correlates with the distance of the image of the emitter to the main plane. If the distance of the image of the emitter from the main plane increases, the image of the emitter appears to an observer to come closer. Conversely, if the distance of the image of the emitter from the main plane decreases, the image of the emitter appears farther away from an observer. Due to the focal length of the optical modulation unit, the distance to an image of an emitter that can be perceived by an observer can thus be set to a predetermined distance. For an observer, a three-dimensional point cloud can thus be generated, which can also represent a three-dimensional image. The image of an emitter can represent both a virtual and a real image of the emitter. In the case of a virtual image, the image of the emitter that can be perceived by an observer can also be located behind the main plane.

According to at least one embodiment, the optical display device comprises.

a plurality of emitters arranged to emit electromagnetic radiation in a main emission direction, and at least one optical modulation unit having an adjustable focal length, wherein the emitters are arranged in a main plane, the emitters can be controlled separately from each other, the optical modulation unit is arranged downstream of the emitters in the main emission direction, and images of the emitters are generated by means of the optical modulation unit, wherein the images of the emitters each have a distance from the main plane which can be predetermined by means of the adjustable focal length.

An optical display device described here is based, among others, on the following considerations: In the case of human observers, the determination of a distance to an optically perceptible object is based on both the inward rotation of the eyes (vergence) and the distance at which the eye perceives an object sharply (accommodation). Vergence and accommodation are correlated for real objects. When displaying three-dimensional image content, the three-dimensional impression can be evoked by simulating vergence, whereby different image content corresponding to vergence is presented to the left and right eye. For example, shutter or polarized glasses can be used for this purpose. Conventional systems for displaying three-dimensional content often work only by means of such simulated vergence.

However, if a three-dimensional image is suggested to a human observer via simulated vergence without causing a corresponding accommodation of the eyes, a so-called vergence-accommodation conflict results for the observer from the inappropriate accommodation. For example, when viewing a three-dimensional image displayed on a screen by means of a stereoscopic display device, the accommodation distance corresponds to the distance of the observer from the screen, while the distance to the displayed object perceived by the simulated vergence may also be in front of or behind the screen. Due to this accommodation-vergence conflict, side effects such as fatigue and discomfort may occur. In order to enable the observer to view three-dimensional content in a largely fatigue-free and comfortable manner, it is advantageous to also map the correct accommodation of the eyes. Previous approaches to address this problem use holographic methods with, for example, coherent electromagnetic radiation in combination with spatial light modulators. Spatial light modulators can be, for example, phase or amplitude displays that can modulate coherent electromagnetic radiation in their phase and/or amplitude. The resolution of a scene generated by means of coherent electromagnetic radiation is basically limited by speckle effects. Furthermore, spatial light modulators are comparatively complex arrangements, which so far seem unsuitable for use in marketable products.

The optical display device described herein makes use, among others, of the idea of generating an image of each emitter of an optical display device by means of a optical modulation unit having an adjustable focal length. The generated images of the emitters each have a distance to the main plane of the optical display device which can be predetermined by the focal length of the optical modulation unit. This causes accommodation of the eyes to the distance of the image at which the image can be sharply perceived. This makes it possible to create a three-dimensional appearance of a predeterminable image for the human eye. By replicating the accommodation of the eyes, an accommodation-vergence conflict can advantageously be reduced or avoided. A three-dimensional scene can thus be generated for any number of observers. Furthermore, a lifelike parallax results through a shift of the observer position. In other words, an observer can move within certain limits around a three-dimensional object displayed by means of the optical display device described herein. Further, there is no longer a need for a large coherence of electromagnetic radiation, since a fixed phase relationship of electromagnetic radiation from different emitters is not required, and thus the emitters used need not be coherent radiation sources. Generating a point cloud from the image of a two-dimensional display at different depth planes can be an important application for this technology.

Furthermore, a uniform image content is displayed for the left and right eye. A channel separation for the image information of the left and right eye can thus be advantageously omitted.

According to at least one embodiment of an optical display device, exactly one optical modulation unit is arranged downstream of the plurality of emitters. In particular, a display device has a plurality of groups, each comprising a plurality of emitters, downstream of each of which a optical modulation unit is arranged. A optical modulation unit can thus adjust the focal length of a group of emitters. If different emitters within a group of emitters are to be assigned a different focal length, accordingly the switch-on time of the emitters within this group must be selected differently. For example, the optical modulation unit is large—in the order of millimeters—compared to the size of a single emitter of the optical display device, which may be in the order of micrometers.

According to at least one embodiment of an optical display device comprising a plurality of optical modulation units, exactly one optical modulation unit is arranged downstream of each emitter. The optical modulation units can be controlled separately from each other. Each optical modulation unit can thus be set to an individual focal length. In particular, the number of emitters corresponds to the number of optical modulation units. If exactly one optical modulation unit is downstream of each emitter, each emitter can advantageously be assigned any predeterminable focal length of the optical modulation unit. Furthermore, additional emitters can also be present which do not have any optical modulation unit downstream thereof.

According to at least one embodiment of the optical display device, the focal length of the optical modulation units may be varied at a frequency of at least 5 kHz, preferably at least 10 kHz, and particularly preferably at a frequency of at least 10 MHz. The focal length of the optical modulation units may oscillate continuously. The optical modulation unit can oscillate close to its own resonance frequency. This can advantageously result in a particularly uniform oscillation with a large amplitude and a stable frequency.

According to at least one embodiment, the electromagnetic radiation emitted by the emitters has a chromaticity coordinate, and the chromaticity coordinates of the electromagnetic radiation of different emitters are adjustable independently of each other. A chromaticity coordinate is a color impression that is perceptible to the human eye and that results from the perception of an electromagnetic radiation.

For example, an emitter comprises a plurality of emission areas, each with different chromaticity coordinates. Thus, by mixing the chromaticity coordinates, any chromaticity coordinate located within the area spanned by the chromaticity coordinates of the individual emission regions can be achieved. In particular, an emitter is formed with emission regions that emit electromagnetic radiation in a red spectral region, a green spectral region, and a blue spectral region.

According to at least one embodiment of the optical display device, the emitters are formed with at least one light-emitting diode or at least one laser diode. Furthermore, each emitter may comprise one or more light-emitting diodes, one or more laser diodes, or a combination of at least one light-emitting diode and at least one laser diode. Also, a portion of the emitters may be formed with light-emitting diodes and another portion of the emitters may be formed with laser diodes. Light-emitting diodes particularly comprise inorganic light-emitting diodes. Light-emitting diodes advantageously have a particularly short response time and emit incoherent electromagnetic radiation. Incoherent radiation can prevent possible adverse effects of coherent radiation, such as the formation of undesirable speckle patterns. Laser diodes, on the other hand, advantageously have a particularly high luminance and can advantageously be imaged easily and with low error by means of optics.

According to at least one embodiment of an optical display device, the optical modulation unit comprises a first optical element movable along the main emission direction and the focal length of the optical modulation unit is adjustable by means of the movement of the first optical element. For example, in an optical system formed of a first optical element and a second optical element, the first optical element and the second optical element each comprising a lens, the focal length of the optical system can be adjusted by a distance between the two optical elements.

According to at least one embodiment of the optical display device, the deflection of the first optical element is performed by means of electrostatic actuators. An electrostatic actuator can be represented by a plate capacitor. Depending on a voltage applied to the plates, an attractive or a repellent electrostatic force is generated on the plates. Electrostatic actuators are characterized in particular by their high speed. A fast variation of the voltage signal allows an advantageously fast modulation of the focal length of the optical modulation unit.

According to at least one embodiment of the optical display device, the first optical element is a diffractive optical element. Diffractive elements are structured materials with a structure size smaller than or equal to the order of magnitude of the wavelength of an electromagnetic radiation in the wavelength range visible to the human eye. A diffractive optical element is an optical element that can influence the propagation of electromagnetic radiation by means of diffraction and interference effects. For example, the effect of a refractive element, in particular a lens, can also be achieved by a diffractive element. Compared to a refractive element, a diffractive element can be smaller and lighter, which means that it has a lower mass inertia and can thus advantageously perform a fast oscillating movement.

According to at least one embodiment of the optical display device, the first optical element has a meta-lens structure. A meta-optic can be understood as a meta-material, for example a glass, which is structured in such a way that it has a particular optical property that is precisely tailored to the application. Meta-lenses or meta-optical elements have structure sizes that are significantly smaller than the wavelength of electromagnetic radiation in the wavelength range visible to the human eye. In particular, a meta-optical structure is characterized by structure sizes smaller than one tenth of the wavelength of electromagnetic radiation passing through it. Such small structures can have a diffractive effect for electromagnetic radiation. Meta-optical structures can mimic the optical effect of larger structures, such as refractive structures, while being much more compact and smaller in size. Smaller and lighter structures can advantageously be moved at a particularly high frequency.

According to at least one embodiment of the optical display device, the emitters are provided for emitting electromagnetic radiation pulses with a pulse width of at most 20 μs, preferably of at most 10 ns and particularly preferably of at most 1 ns. The pulse width is to be understood as a full width at half maximum (FWHM). A full width at half maximum is the time of a pulse measured from above a level of 50% of the maximum pulse energy in its peak to falling below this 50% threshold. Small pulse widths are particularly important, for example, to realize dimming of an emitter by means of pulse width modulation (PWM) without causing a flicker effect visible to a human observer.

Based on a pulse width of 1 ns, a point cloud could be displayed from a display device having a plurality of emitters, wherein the resolution of the distance of an image of an emitter in the main emission direction comprises 100 levels, and the point cloud is refreshed with a repetition frequency of 60 Hz. Further, a brightness of the emitters can be adjusted by pulse width modulation with at least 256 steps, corresponding to a resolution of 8-bit. Furthermore, sequential representation of at least three different colors may be performed with a frequency of at least 500 Hz. A sequential representation of colors with a frequency of 500 Hz advantageously helps to prevent a color breakup effect. The color breakup effect describes a color shift that is perceptible to an observer during rapid image movements and that can occur when colors are displayed sequentially.

According to at least one embodiment of the optical display device, the emitters have an edge length of at most 50 μm in a direction transverse to the main emission direction, preferably of at most 20 μm and particularly preferably of at most 10 μm. A small edge length results in a small expansion of the emitter as a whole. A small expansion of the emitter facilitates its focusing in an imaging optics. To ensure sufficient brightness of the emitter, a high luminance of the emitter is also advantageous.

Furthermore, a method for operating an optical display device is given. In particular, the method is used to operate an optical display device described herein. That is, all features disclosed for the optical display device are also disclosed for the method of operation and vice versa.

According to at least one embodiment of a method for operating an optical display device comprising a plurality of emitters which emit electromagnetic radiation in a main emission direction, and at least one optical modulation unit which has an adjustable focal length, the emitters are arranged in a main plane and are each controlled separately from one another. The optical modulation unit is arranged downstream of the emitters in the main emission direction. Images of the emitters are generated by means of the optical modulation unit, with the images of the emitters each being at a distance from the main plane.

According to at least one embodiment of the method, the focal length of the optical modulation unit oscillates and the distance of the image of an emitter from the main plane is adjusted by a phase-dependent control of the emitter. The optical modulation unit can oscillate at its resonance frequency, resulting in a particularly uniform oscillation with a large amplitude. The emitters are each switched on in phase with the oscillating motion of the optical modulation unit, provided that the focal length of the optical modulation unit is in the appropriate position to produce a desired distance of the image of the emitter from the main plane. In the case of a continuously moving focal length of the optical modulation unit, the resolution of the displayed position of the image of the emitter depends on the minimum achievable pulse width of the emitter. The emitter is switched on exactly when the focal length corresponds to the distance of the image of the emitter to be displayed. Assuming a modulation frequency of the optical modulation unit of 10 kHz, this results in a period duration of 100 μs. If the image of the emitter is to be resolved in 100 steps, for example, this results in a time window of 1 μs in which the emitter is switched on and off again. A higher resolution of the emitter image intervals thus requires a reduced pulse width and thus a faster emitter.

According to at least one exemplary embodiment of the method of operating an optical display device having a plurality of optical modulation units, the focal lengths of the optical modulation units oscillate with a fixed phase relationship to each other. In other words, the optical modulation units start their oscillation with a fixed, preferably equal phase relation to each other and the phase relation between them remains rigid. To represent different distances between the images of the emitters, the switch-on times of the emitters must also be different from each other. In other words, simultaneous operation of the emitters thus allows only a uniform shift of the distance of all emitters to the main plane.

According to at least one embodiment of the method for operating an optical display device comprising a plurality of emitters emitting electromagnetic radiation in a main emission direction and at least one optical modulation unit having an adjustable focal length, the emitters are arranged in a main plane and are driven separately from each other. The optical modulation unit is arranged downstream of the emitters in the main emission direction. Images of the emitters are generated by means of the optical modulation unit, with the images of the emitters each being at a distance from the main plane.

According to at least one embodiment of the method, the emitters are driven simultaneously within a display period and the focal length of the optical modulation unit is constant during the display period. The display period denotes the maximum time span available to display a given image. Assuming a refresh rate of 60 Hz, this results in a display period of 16.6 ms. During this display period, the focal length of the optical modulation unit is moved to the predetermined position to make the image of the emitter appear at the predetermined distance and the emitter produces a predetermined brightness and, for example, color combination. The focal length of the optical modulation units should be sufficiently constant during the display period to prevent flickering of the image of the emitter in the main emission direction. The time required for the optical modulation unit to adjust to the specified focal length is significantly less than the display period. The requirement for the minimum achievable pulse duration of the emitters is advantageously reduced in this mode of operation.

According to at least one embodiment of the method for operating an optical display device, the display period is between 1 ms and 16 ms inclusive. The optical modulation unit thereby preferably remains at the respective set position with a deviation of less than 10%, further preferably with a deviation of less than 1%. The requirements for the speed of the emitter are advantageously reduced in this embodiment. For example, the emitters could also be formed with a liquid crystal which, with a response time of 1 ms, is sufficiently fast to display a three-dimensional image with the aid of such a optical modulation unit.

According to at least one embodiment of the method for operating an optical display device, the brightness of the electromagnetic radiation emitted by the emitters is adjusted during the display period by means of pulse width modulation. The reduced brightness is achieved, for example, by a shorter turn-on time of the emitter. In addition, dimming of the emitters can be achieved by means of analog current dimming. Thus, a larger dynamic range of the brightness of the emitters can be advantageously displayed.

According to at least one embodiment of the method for operating an optical display device, exactly one optical modulation unit is arranged downstream of each emitter. The optical modulation units can be controlled separately from each other. Each optical modulation unit can thus be set to an individual focal length. In particular, the number of emitters corresponds to the number of optical modulation units. If exactly one optical modulation unit is downstream of each emitter, each emitter can advantageously be assigned any predeterminable focal length of the optical modulation unit. Furthermore, additional emitters can also be present which do not have any optical modulation units arranged downstream thereof.

Further advantages and advantageous embodiments and developments of the optical display can be derived from the following exemplary embodiments shown in connection with the figures.

Identical, similar or similar-acting elements are provided with the same reference signs in the figures. The figures and the proportions of the elements shown in the figures are not to be regarded as true to scale. Rather, individual elements may be shown exaggeratedly large for better representability and/or for better comprehensibility.

Figure 1:
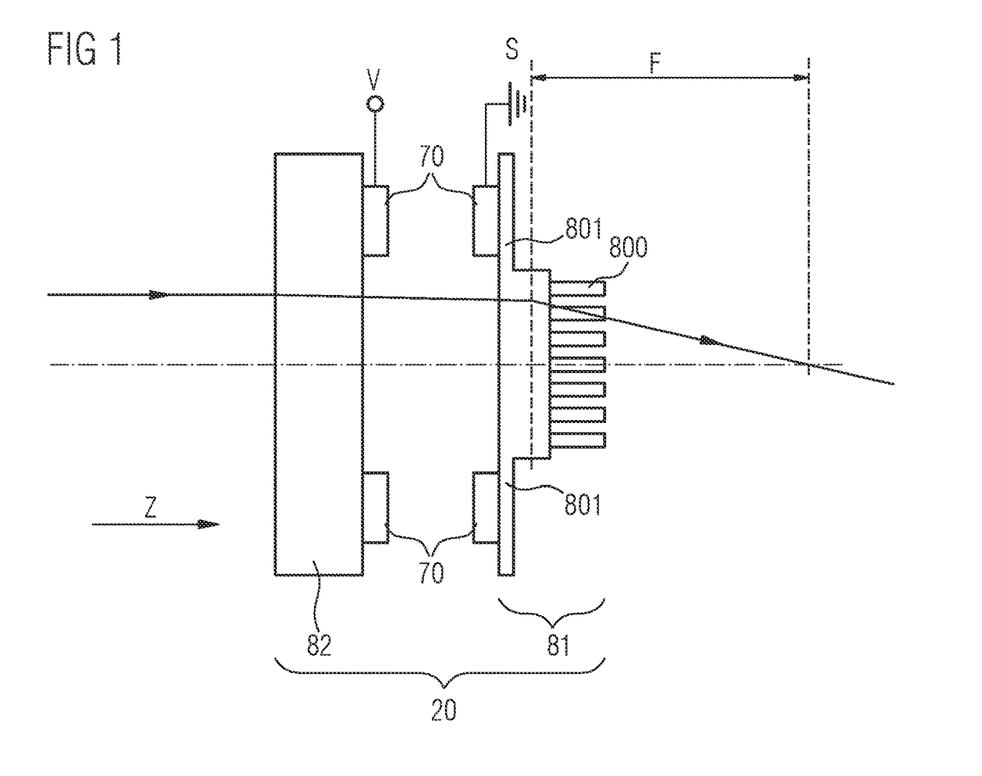
FIG. 1 a schematic sectional view of a optical modulation unit described herein according to a first embodiment, FIG. 2 a schematic sectional view of an optical display device described herein according to a first embodiment, and FIGS. 3 and 4 schematic sectional views of an optical display device described herein according to a second embodiment.

FIG. 1 shows a schematic sectional view of a optical modulation unit 20 described herein according to a first exemplary embodiment. The optical modulation unit 20 comprises a first optical element 81 and a second optical element 82. The optical modulation unit 20 has an image-side main plane S associated therewith. Electromagnetic radiation passes through the optical modulation unit 20 in a main direction Z, which is parallel to the main axis of the optical modulation unit 20. The main direction Z extends transversely, in particular perpendicularly, to the main direction of extension of the first optical element 81 and the second optical element 82. The optical elements 81, 82 are arranged one behind the other in the main direction Z. The electromagnetic radiation first passes through the second optical element 82 and then through the first optical element 81. A reverse radiation path can also be realized. In other words, the electromagnetic radiation can propagate in both positive and negative main directions Z. The optical elements 81, 82 each comprise electrostatic actuators 70. The electrostatic actuators 70 are formed with an electrically conductive material and are mechanically fixed to the first optical element 81 and the second optical element 82. A voltage V can be applied to the electrostatic actuators 70, causing an attractive or a repellent force to act on the electrostatic actuators 70. The distance between the optical elements 81, 82 can be varied depending on the voltage V applied to the electrostatic actuators 70.

In addition to the electrostatic actuators 70, the first optical element 81 comprises suspensions 801 and a meta-lens structure 800. The suspensions 801 are formed with a flexible material, for example a thin glass or silicon structure. With the help of the suspensions 801, the first optical element 81 can be mechanically flexibly attached. Due to the flexible attachment, the first optical element 81 can be moved in the direction of the main direction Z. The meta-lens structure 800 is fixedly connected to the flexible suspensions 801. The meta-lens structure 800 comprises in particular structures that are smaller than one tenth of the wavelength of an electromagnetic radiation used. In particular, the meta-lens structure 800 is not a refractive optical element, but a diffractive optical element. The meta-lens structure 800 can modulate incident wavefronts of electromagnetic radiation in a predeterminable manner, for example using diffraction and interference effects. In particular, the meta-lens structure 800 is formed to exhibit the behavior of a refractive lens, and to image parallel incident electromagnetic radiation onto it at a focal point located at a focal length F. The focal length F is to be understood as the distance from the image-side main plane S to the focal point. The first optical element 81 is advantageously particularly small and light-weight compared to a conventional lens made of a solid material, so that it can be advantageously excited and moved in the main direction Z at a frequency of several kilohertz.

The second optical element 82 is formed with a transparent material and comprises another diffractive optical structure. Alternatively, the second optical element 82 may comprise a refractive optical structure, such as a conventional lens made of a solid material. A conventional refractive lens may provide a cost advantage, among other benefits. The second optical element 82 is preferably at a stationary position. Advantageously, therefore, the second optical element 82 does not require a particularly lightweight design as it does not need to be capable of rapid movement. The first optical element 81 and the second optical element 82 form an imaging optical system which has a variable focal length F. Depending on the distance of the first optical element 81 from the second optical element 82, the focal length F of the optical modulation unit 20 can be varied.

Figure 2:
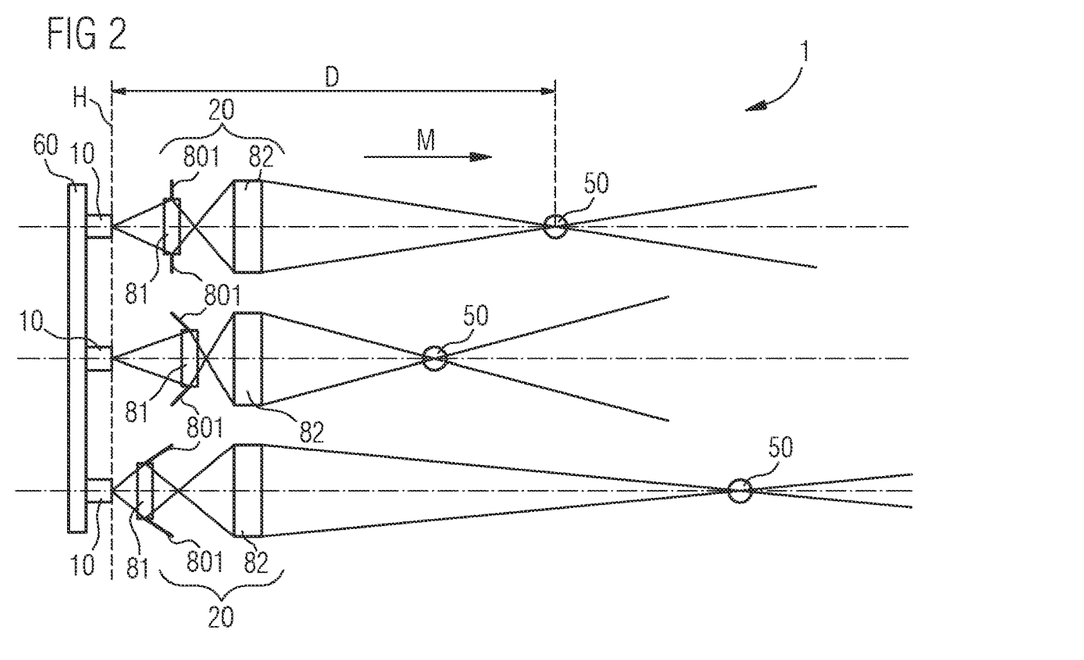

FIG. 2 shows a schematic sectional view of an optical display device described herein according to a first exemplary embodiment. The optical display device 1 shown comprises a plurality of optical modulation units 20, as well as a plurality of emitters 10. The emitters 10 are arranged in a common main plane H and are located on a carrier 60. Downstream of each emitter 10 is exactly one optical modulation unit 20. The carrier 60 is mechanically stable and comprises, in particular, an electronic control of the emitters 10 and can also serve for electrical contacting of the emitters 10.

Each emitter 10 comprises at least three emission regions, each of which is arranged to emit electromagnetic radiation at a different emission wavelength. The chromaticity coordinate of the electromagnetic radiation of each emitter 10 is thus adjustable. The emitters 10 have a main emission direction M which extends transversely, in particular perpendicularly, to the main plane H. Furthermore, the main emission direction runs parallel to the maindirection Z.

A plurality of optical modulation units 20 are arranged downstream of the emitters 10 in their main emission direction M, according to the first exemplary embodiment shown in FIG. 1. The focal length F of the optical modulation units 20 depends on the respective distance between the first optical elements 81 and the second optical elements 82. The focal length F of each optical modulation unit 20 can be set independently of one another to a predeterminable value.

Each optical modulation unit 20 generates an image 50 of its associated emitter 10 at a distance D from the main plane H of the emitters 10. The distance D of the image 50 from the emitters 10 can be set to a predetermined value with the aid of the optical modulation unit 20. Thus, a three-dimensional image visible to a human observer E can be generated.

In operation of the optical display device 1, the focal length F of the optical modulation unit 20 may oscillate, for example. The distance D of the image 50 of an emitter 10 from the main plane H is then adjusted by a phase-dependent control of the emitter 10. In particular, the focal length F of the optical modulation unit 20 oscillates at its resonance frequency, resulting in a particularly uniform oscillation with a large amplitude. The emitters 10 are each turned on in phase with the oscillating motion of the optical modulation unit 20, provided that the focal length F of the optical modulation unit 20 is in the appropriate position to produce a desired distance D of the image 50 of the emitter 10 from the main plane H. In other words, each emitter 10 is turned on exactly when the focal length F corresponds to the distance D of the image 50 of the emitter 10 to be displayed.

In the case of a continuously moving focal length F of the optical modulation unit 20, the resolution of the represented position of the image 50 of the emitter 10 depends on the minimum achievable pulse width of the emitter 10. The achievable resolution of the represented position of the image 50 of the emitter 10 depends on the width of the time slot in which the emitter 10 is turned on. A narrower time slot requires a faster emitter 10 and advantageously enables a high resolution.

Furthermore, during operation of the optical display device 1, the focal length F of the optical modulation unit 20 may be constant within a display period. The emitters 10 are then driven simultaneously within the display period. The display period denotes the maximum time span available to display a given image. Assuming a refresh rate of 60 Hz, this results in a display period of 16.6 ms. During this display period, the focal length F of the optical modulation units 20 is moved to the predetermined position to make the image 50 of the emitter 10 appear at the predetermined distance D, and the emitter 10 produces a predetermined brightness and, for example, color combination. The focal length F of the optical modulation unit 20 should be sufficiently constant during the display period to prevent flickering of the image 50 of the emitter 10 in the main emission direction M. The time required for the optical modulation unit 20 to adjust to the predetermined focal length F is significantly less than the display period. The requirement for the minimum achievable pulse duration of the emitters 10 is advantageously reduced in this mode of operation. Consequently, an emitter 10 with a less small minimum pulse width can also be used.

Figure 3:
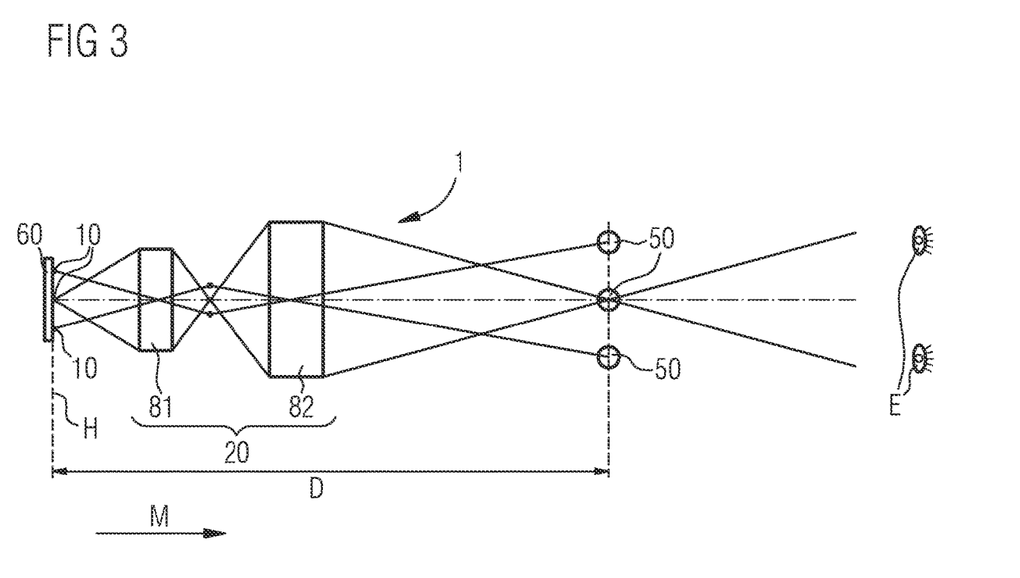

FIG. 3 shows a schematic sectional view of an optical display device described herein according to the second exemplary embodiment. The optical display device 1 shown here comprises a plurality of emitters 10 arranged in a common main plane H on a carrier 60. The emitters 10 have a main emission direction M perpendicular to the main plane H.

Downstream of the emitters 10 in their main emission direction M is a optical modulation unit 20 according to the exemplary embodiment of a optical modulation unit 20 shown in FIG. 1. The optical modulation unit 20 has a sufficiently large expansion in its main extension direction that all emitters 10 are imaged by means of the one optical modulation unit 20.

For a human observer E, the images 50 of the plurality of emitters 10 are located at a distance D from the main plane H. This distance D is now the same for all emitters 10 since there is only one common optical modulation unit 20. Advantageously, the configuration with only one optical modulation unit 20 for a plurality of emitters 10 reduces the requirements for the minimum size of the optical modulation unit 20. Furthermore, a smaller number of optical modulation units 20 is sufficient to form an optical display device 1.

Figure 4:
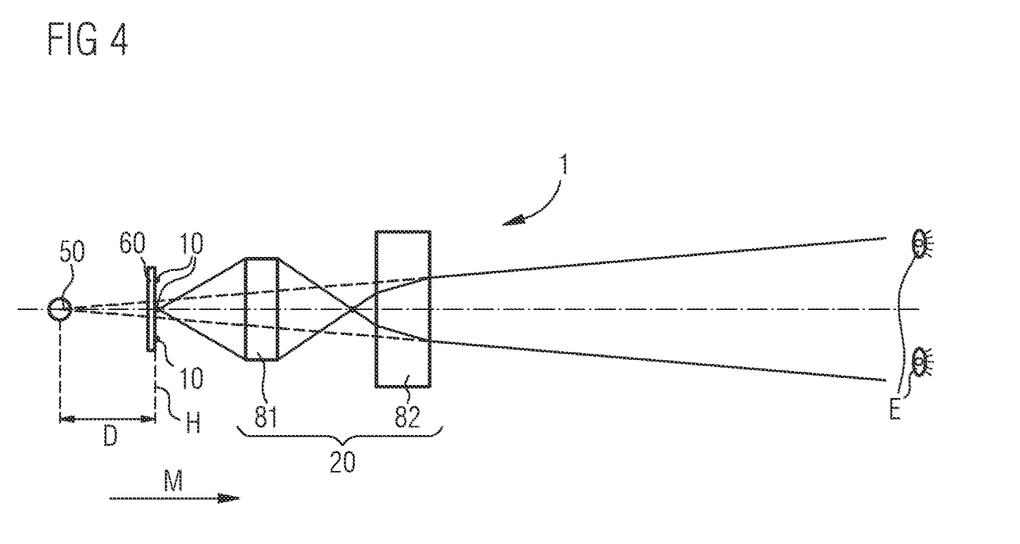

FIG. 4 shows a schematic sectional view of an optical display device 1 described herein according to the second embodiment. The exemplary embodiment of an optical display device 1 shown herein comprises a plurality of emitters 10 arranged in a common main plane H on a carrier 60. The emitters 10 have a main emission direction M that is perpendicular to the main plane H. Downstream of the emitters 10 in their main emission direction M is a optical modulation unit 20 according to the exemplary embodiment of a optical modulation unit 20 shown in FIG. 1. The image 50 of the emitters 10 is located behind the main plane H for an observer E. The distance D of the image 50 of the emitters 10 has a negative distance D to the main plane H. The image 50 is thus a virtual image of the emitters 10. The impression of a virtual image of the emitters 10 results from a suitable setting of the focal length F of the optical modulation unit 20. This advantageously increases the image depth which can be used for the representation of a three-dimensional image.

The invention is not limited by the description based on the exemplary embodiments. Rather, the invention encompasses any new feature as well as any combination of features, which in particular includes any combination of features in the patent claims, even if this feature or combination itself is not explicitly stated in the patent claims or embodiments.

LIST OF REFERENCE SIGNS 1 optical display device
10 emitter
20 optical modulation unit
50 image
60 carrier
70 electrostatic actuators
81 first optical element
82 second optical element
800 meta-lens structure
801 suspension
H main plane
E observer
V voltage
Z main direction
M main emission direction
D distance
F focal length
S image side main plane

The invention claimed is:

1. An optical display device comprising
a plurality of emitters configured to emit electromagnetic radiation in a main emission direction, and
at least one optical modulation unit having an adjustable focal length, wherein
the emitters are arranged in a main plane extending transversely to the main emission direction of the emitters,
the emitters are separately controllable from one another,
the optical modulation unit is arranged downstream of the emitters in the main emission direction,
images of the emitters are generated by means of the optical modulation unit, the images of the emitters each having a distance from the main plane which can be predetermined by means of the adjustable focal length, and
the optical modulation unit comprises a first optical element and a second optical element, wherein the first optical element is movable along the main emission direction, and the focal length of the optical modulation unit is adjustable by a distance of the first optical element to the second optical element.

2. The optical display device according to claim 1, in which exactly one optical modulation unit is arranged downstream of the plurality of emitters.

3. The optical display device according to claim 1, comprising a plurality of optical modulation units, in which exactly one optical modulation unit is arranged downstream of each emitter.

4. The optical display device according to claim 1, wherein the focal length of the optical modulation unit can be varied with a frequency of at least 5 kHz.

5. The optical display device according to claim 1, wherein the electromagnetic radiation emitted by the emitters has a chromaticity coordinate, and the chromaticity coordinates of the electromagnetic radiation of different emitters are independently adjustable.

6. The optical display device according to claim 1, wherein each emitter is formed with at least one light-emitting diode and/or at least one laser diode.

7. The optical display device according to claim 1, wherein a deflection of the first optical element is performed by means of electrostatic actuators.

8. The optical display device according to claim 1, wherein the first optical element is a diffractive optical element.

9. The optical display device according to claim 8, wherein the first optical element comprises a meta-lens structure.

10. The optical display device according to claim 1, wherein the emitters are provided for generating electromagnetic radiation pulses with a pulse width of at most 20 μs.

11. The optical display device according to claim 1, wherein the emitters have an edge length of 50 μm or less.

12. The optical display device according to claim 7, wherein the electrostatic actuator is a plate capacitor.

13. A method of operating an optical display device comprising
a plurality of emitters emitting electromagnetic radiation in a main emission direction, and
at least one optical modulation unit having an adjustable focal length, wherein
the emitters are arranged in a main plane,
the emitters are controlled separately from each other,
the optical modulation unit is arranged downstream of the emitters in the main emission direction,
images of the emitters are generated by means of the optical modulation units, wherein
the images of the emitters each have a distance from the main plane,
the focal length of the optical modulation unit oscillates, and
in each case the distance of the image of an emitter from the main plane is adjusted by a phase-dependent control of the emitter.

14. The method of operating an optical display device according to claim 13, comprising a plurality of optical modulation units, wherein the focal lengths of the optical modulation units oscillate with a fixed phase relationship to each other.

15. A method of operating an optical display device comprising
a plurality of emitters emitting electromagnetic radiation in a main emission direction,
at least one optical modulation unit having an adjustable focal length, wherein
the emitters are arranged in a main plane,
the emitters are controlled separately from each other,
the optical modulation unit is arranged downstream of the emitters in the main emission direction,
images of the emitters are generated by means of the optical modulation unit, wherein
the images of the emitters each have a distance from the main plane,
the emitters are driven within a display period and the focal length of the optical modulation units is constant during the display period, and the optical modulation unit comprises a first optical element and a second optical element, wherein the first optical element moves along the main emission direction, and the focal length of the optical modulation unit is adjusted by a distance of the first optical element to the second optical element.

16. The method of operating an optical display device according to claim 15, wherein the display period is between 1 ms and 16 ms, inclusive.

17. The method of operating an optical display device according to claim 15, wherein a brightness of electromagnetic radiation emitted from the emitters during the display period is adjusted by means of pulse width modulation.

18. The method of operating an optical display device according to claim 15, wherein exactly one optical modulation unit is arranged downstream of each emitter.

19. The method of operating an optical display device according to claim 13, wherein the optical modulation unit comprises a first optical element and a second optical element, the first optical element comprises a meta-lens structure and is movable along the main emission direction, and the focal length of the optical modulation unit is adjustable by a distance of the first optical element to the second optical element.

20. The method of operating an optical display device according to claim 15, wherein the first optical element comprises a meta-lens structure.

\* \* \* \* \*